(12) United States Patent
Zhou

(10) Patent No.: US 11,853,201 B2
(45) Date of Patent: Dec. 26, 2023

(54) SELECTIVE SINGLE-LEVEL MEMORY CELL OPERATION

(71) Applicant: Micron Technology, Inc., Boise, ID (US)

(72) Inventor: Donghua Zhou, Suzhou (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/824,725

(22) Filed: May 25, 2022

(65) Prior Publication Data

US 2023/0385191 A1 Nov. 30, 2023

(51) Int. Cl.
*G06F 12/02* (2006.01)

(52) U.S. Cl.
CPC .. *G06F 12/0246* (2013.01); *G06F 2212/7206* (2013.01)

(58) Field of Classification Search
CPC ............... G06F 12/0246; G06F 2212/7206
See application file for complete search history.

(56) References Cited

U.S. PATENT DOCUMENTS

| 8,482,993 | B2 | 7/2013 | Strasser et al. |
| 10,248,317 | B2 | 4/2019 | Yano et al. |
| 11,182,105 | B2 | 11/2021 | Lee et al. |
| 2012/0250408 | A1* | 10/2012 | Takeyama ........... G11C 11/5628 365/185.03 |
| 2020/0194075 | A1* | 6/2020 | Igahara ................. G11C 16/08 |
| 2020/0293221 | A1* | 9/2020 | Jang .................... G06F 12/0246 |
| 2020/0342945 | A1* | 10/2020 | Sarkar .................. G06F 3/0619 |
| 2022/0253239 | A1* | 8/2022 | Jang ..................... G06F 3/0656 |

* cited by examiner

*Primary Examiner* — Chie Yew
(74) *Attorney, Agent, or Firm* — Brooks, Cameron & Huebsch, PLLC

(57) ABSTRACT

A method includes selectively configuring a first subset of non-volatile memory blocks to operate in a single-level mode, configuring the first subset of non-volatile memory blocks to collectively operate as a pseudo single-level cache, writing data associated with performance of a memory operation to the first subset of non-volatile memory blocks, and migrating the data from the first subset of non-volatile memory blocks to a second subset of non-volatile memory blocks.

17 Claims, 5 Drawing Sheets

SELECTIVE SINGLE-LEVEL MEMORY CELL OPERATION

TECHNICAL FIELD

Embodiments of the disclosure relate generally to memory sub-systems, and more specifically, relate to selective single-level memory cell operation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
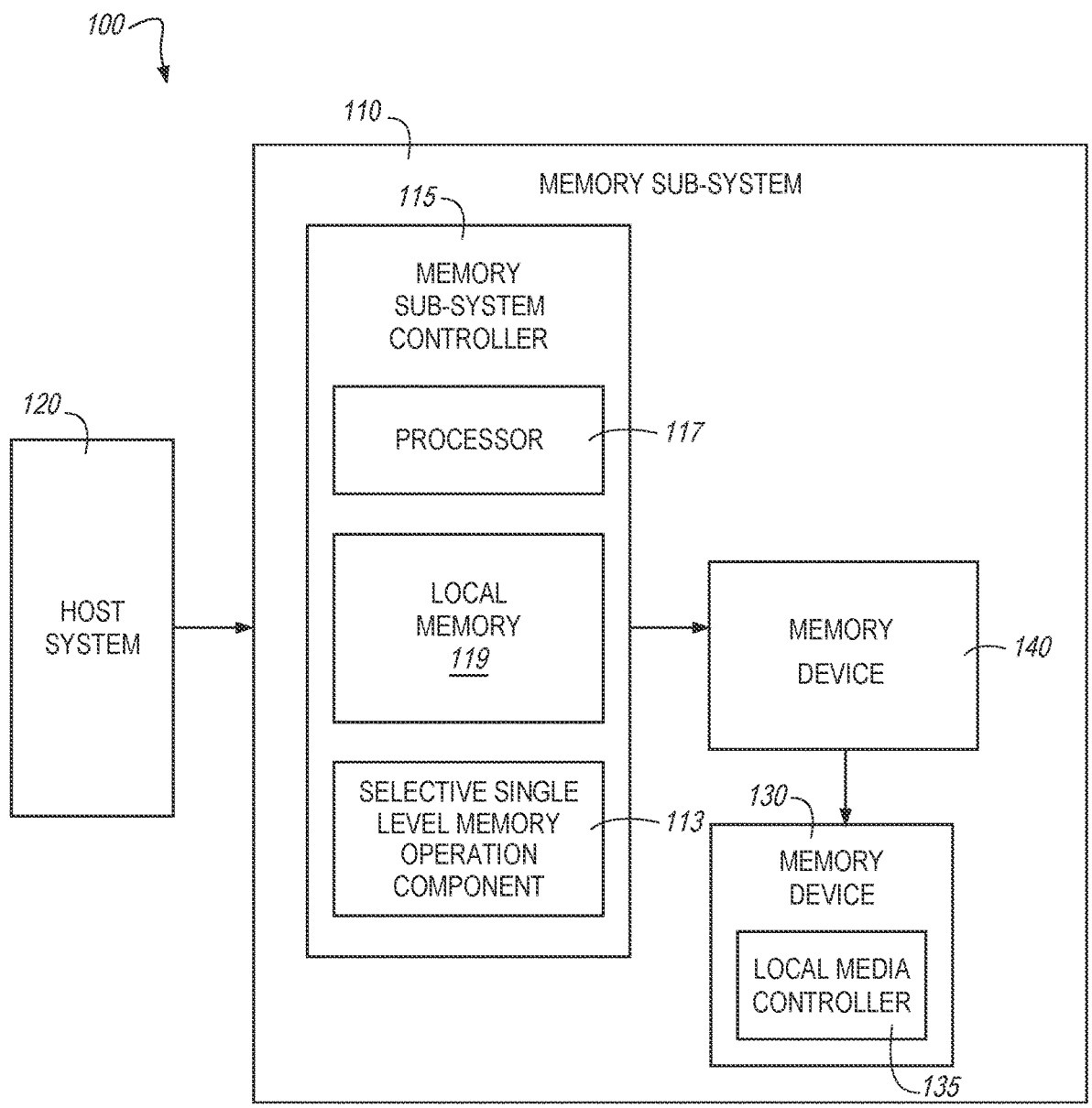
FIG. 1 illustrates an example computing system that includes a memory sub-system in accordance with some embodiments of the present disclosure.

Aspects of the present disclosure are directed to selective single-level memory cell operation, in particular to memory sub-systems that include a selective single-level memory cell operation component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

The NAND memory device can be coupled to a cache. The cache can include a region of a physical memory storage used to temporarily store data that is likely to be used again. For instance, the cache can include a volatile memory device such as a DRAM and/or a SRAM. The cache can include a pool of data entries that have been written thereto. The cache can be configured to operate in accordance with a cache management policy (i.e., caching policy) such as a write-through policy or a write-back policy.

A "write-back policy" generally refers to a caching policy in which data is written to the cache without the data being concurrently written to a corresponding memory device such as a NAND memory device. Accordingly, data written to the cache (e.g., a volatile memory device) operating in accordance with a write-back policy may not have a corresponding data entry in the corresponding memory device such as the NAND memory device. Therefore, the data may be subject to loss when an APL event occurs. Accordingly, various approaches utilize a back-up power supply. The backup power supply can supply backup power to the memory sub-system in the event of an Asynchronous Power Loss (APL) event. As used herein, an APL event refers to a sudden and unexpected power loss that is not preceded by a shutdown notification from the host. Thus, when operating as intended the backup power supply can supply a sufficient amount of backup power to permit data to be written from the cache to the corresponding memory device such as the NAND memory device. That is, the backup power can be supplied to ensure that data is not lost responsive to a APL event. Yet, the backup power supply may be prone to failure, particularly as the backup power supply ages over an operational lifetime of the memory sub-system. Accordingly, the backup power supply may not provide the sufficient amount of backup power to permit data to be written from the cache to the corresponding memory device such as the NAND memory device when an APL event occurs. Thus, even though a backup power supply is present, the data in approaches employing a write-back policy may be subject to loss in an APL event.

A "write-through policy" generally refers to a caching policy in which data is written to both the cache and a corresponding memory device such as a NAND memory device. Accordingly, data written to the cache operating in accordance with a write-through policy has a corresponding data entry in the corresponding memory device. Therefore, the data may not be subject to loss when an APL event occurs.

However, operation of a cache in accordance with a write-through policy may lead to write amplification. For instance, an amount (e.g., 4 kilobytes) of host data per host write operation can be less than a page size (e.g., 48 kilobytes) of a corresponding memory device. The amount of host data can be padded with an amount (e.g., 44 kilobytes) of pad data such that the amount of the host data and the amount of the pad data together equal the page size of the corresponding memory device. Such data padding can permit the host data to be written (along with the pad data) to the memory device.

Yet, such data padding results in write amplification. An amount of write amplification can be based on a ratio between a page size of a memory device (e.g., page size of a NAND) and an amount of host data per host write operation. For example, a raw page size (e.g., 16 kilobytes) of a memory device can be multiplied by a factor (e.g., a factor of 3 for TLCs) to determine an effective page size (e.g., 48 kilobytes) of the memory device. In such examples, the effective page size (or corresponding flush write size) can be divided by the amount of host data (e.g., 4 kilobytes) per host write operation to yield a resultant write amplification factor (e.g., a flush write size of 48 kilobytes/a host write size of 4 kilobytes equals a write amplification factor of 12).

Write amplification can degrade performance of a memory sub-system. Degradation of performance can be undesirable, especially in critical applications and/or in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Moreover, write amplification can shorten an operational lifetime of a memory device. For instance, due to characteristics inherent in NAND memory devices, data quality can degrade over time. Health characteristics, as detailed herein, can indicate a degree of wear of a block of memory cells. For instance, a health characteristic can be a program-erase cycle (PEC) count of a block of memory cells, among other possible health characteristics. A "PEC count" generally refers to the number of times a NAND block has been accessed (e.g., programmed and/or erased). Notably, write amplification inherently increases a quantity of writes, and therefore leads to a corresponding increase in PEC counts of blocks of memory cells. As the PEC count of a block increases, data quality in the block can decrease. In some instances, the PEC count can be a PEC count of a physical block of memory cells. As used herein, a "physical block of memory cells" or "physical block" generally refers to a set of memory cells that store charges corresponding to data values and has an address (e.g., a physical block address) associated therewith. Degradation of data quality can render blocks prone to failures such as causing a read operation performed on a memory cell in the block to fail or return a corrupted/incorrect data value.

Aspects of the present disclosure address the above and other deficiencies by selectively configuring a first subset of non-volatile memory blocks to operate in a single-level mode, configuring the first subset of non-volatile memory blocks to collectively operate as a pseudo single-level cache, writing data associated with performance of a memory operation to the first subset of non-volatile memory blocks configured as the pseudo single-level cache, and migrating the data from the first subset of non-volatile memory blocks to a second subset of non-volatile memory blocks, as detailed herein.

Non-volatile memory blocks configured to operate in a single-level mode store one bit of information per memory cell. For instance, the non-volatile memory blocks can be higher level (e.g., TLC capable of storing 3 bits of information per memory cell) which, when configured in a single-level mode, are configured to only store one bit of information per memory cell. That is, a portion of the non-volatile memory blocks such as non-volatile memory blocks included in a user data zone can be dynamically partitioned (e.g., responsive to an occurrence of detection of a backup power supply failure event during an operational lifetime of the non-volatile memory) to operate in the single-level mode, while a remaining portion of the non-volatile memory blocks can remain configured to operate in a higher level mode (e.g., TLC mode).

The non-volatile blocks configured to operate in the single-level mode can be collectively configured as a pseudo-single level cache. A pseudo single-level cache refers to blocks of non-volatile memory cells that operate collectively as a pseudo single-level cache (from the host perspective), as detailed herein, but which that are formed of multi-level (e.g., TCL) memory cells instead of single-level memory cells. The pseudo single-level cache can promote aspects herein such as the internal migration of data from the portion of the non-volatile memory configured as the pseudo single-level cache to other portions of a non-volatile memory.

Notably, the internal migration or "folding" of data from one non-volatile location to another non-volatile location occurs independent of any direct host interaction and/or with minimal host interaction. Data can be internally migrated within a non-volatile memory (e.g., NAND) from a first location to a second location in an absence of host initiated write operation or with an individual write. For instance, the internal migration can employ an individual write and therefore have a write amplification of one, as compared to what would otherwise be multiple host write operations to write the data directly to the second-subset. Thus, any write amplification and corresponding performance degradation can be reduced, in contrast to other approaches that do not employ selective single-level memory cell operation, and yet approaches herein can effectively and efficiently store the data in blocks having higher level memory cells (e.g., TLCs) by migrating the data from the first portion to the second portion of the non-volatile memory, as detailed herein.

For instance, a first portion (e.g., a first subset of blocks) of a non-volatile memory can be configured to selective operate as a pseudo single-level cache and thus can have an effective page size (e.g., 16 KB) that is less than an effective page size (e.g., 48 KB) of a second portion (e.g., a second subset of blocks) of the non-volatile memory. Accordingly, for host data (e.g., 4 KB) per host write operation the host data can be padded with less pad data (e.g., 12 KB) to permit the host data to be written to the first portion of the non-volatile memory, than an amount of pad data (e.g., 44

KB) that would otherwise be employed to permit the host data to be directly written to the second portion of the non-volatile memory. The reduction in an amount of pad data and associated write operations can reduce write amplification, and yet as mentioned still permits efficient storage of large amounts of data in the higher level (e.g., TLC cells).

Selectively configuring a first subset of non-volatile memory blocks of a plurality of non-volatile memory blocks of a non-volatile memory in a single-level mode can occur responsive to detection of a backup power supply failure event. That is, the backup power supply may generally supply backup power responsive to detection of an APL event. However, as mentioned above when the backup power supply fails (e.g., does not supply and/or cannot supply backup power) data associated with a cache operating in accordance with a write-back policy may be subject to loss when an APL event occurs. Accordingly, approaches herein can detect a backup power supply failure event and can configure the cache to operating in the single-level mode and can configure the cache to operate in accordance with a write-through policy to ensure that data is not lost. For instance, the first subset of non-volatile memory blocks can be configured (e.g., generated) to operate in the single-level mode responsive to detection of a backup power supply failure event, and can be configured to operate in a higher level mode (e.g., multi-level mode, triple-level mode, quad-level mode, or penta-level mode) in an absence of detection of the backup power supply failure event. Thus, each of the non-volatile memory blocks can be utilized to efficiently store large amounts of data and/or operate in accordance with a write-back policy in the absence of a backup power supply failure event, but also permit the timely writing of data from a volatile cache operating in accordance with a cache write-through policy to mitigate data loss and write amplification encountered as a result of an occurrence of a backup power supply failure event, as detailed herein. For instance, employing the first-subset configured in SLC mode can increase a quantity of input/output operations per second (IOPs) as compared to a quantity of IOPS over an equal time period for higher level blocks (e.g., blocks of TLC memory cells) and thus ensure that data is timely stored responsive to detection of a backup power supply failure event.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, a MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms "superblock," "block," "block of memory cells," and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. For instance, in some examples, the memory device 140 can be a DRAM and/or SRAM configured to operate as a cache for the memory device 130. In such instances, the memory device 130 can be a NAND.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device. The memory sub-system 110 can also include additional circuitry or components that are not illustrated.

The memory sub-system 110 can include a selective single-level memory operation component 113. Although not shown in FIG. 1 so as to not obfuscate the drawings, the selective single-level memory operation component 113 can include various circuitry to facilitate aspects of media management, as detailed herein. In some embodiments, the selective single-level memory operation component 113 can include special purpose circuitry in the form of an ASIC, FPGA, state machine, and/or other logic circuitry that can allow the selective single-level memory operation component 113 to orchestrate and/or perform the operations described herein.

In some embodiments, the memory sub-system controller 115 includes at least a portion of the selective single-level memory operation component 113. For example, the memory sub-system controller 115 can include a processor 117 (processing device) configured to execute instructions stored in local memory 119 for performing the operations described herein. In some embodiments, the selective single-level memory operation component 113 is part of the memory sub-system 110, an application, or an operating system.

In a non-limiting example, an apparatus (e.g., the computing system 100) can include a selective single-level memory operation component 113. The selective single-level memory operation component 113 can be resident on the memory sub-system 110. As used herein, the term "resident on" refers to something that is physically located on a particular component. For example, the selective single-level memory operation component 113 being "resident on" the memory sub-system 110 refers to a condition in which the hardware circuitry that comprises the selective single-level memory operation component 113 is physically located on the memory sub-system 110. The term "resident on" can be used interchangeably with other terms such as "deployed on" or "located on," herein.

The selective single-level memory operation component 113 can be configured to selectively configure a first subset of non-volatile memory blocks to operate in a single-level mode, configure the first subset of non-volatile memory blocks to operate as a pseudo single-level cache, write data associated with performance of a memory operation to the first subset of non-volatile memory blocks configured as the pseudo single-level cache, and migrate (fold) the data from the first subset of non-volatile memory blocks to a second subset of non-volatile memory blocks. In some embodiments, the selective single-level memory operation component 113 can be configured to selectively operate the first subset in the single-level mode responsive to detection of a backup power supply failure event, and yet can operate each of the non-volatile memory blocks in a non-volatile memory in a multi-level mode, triple-level mode, quad-level mode, or penta-level mode in an absence of detection of the backup power supply failure event, as detailed herein.

Figure 2:
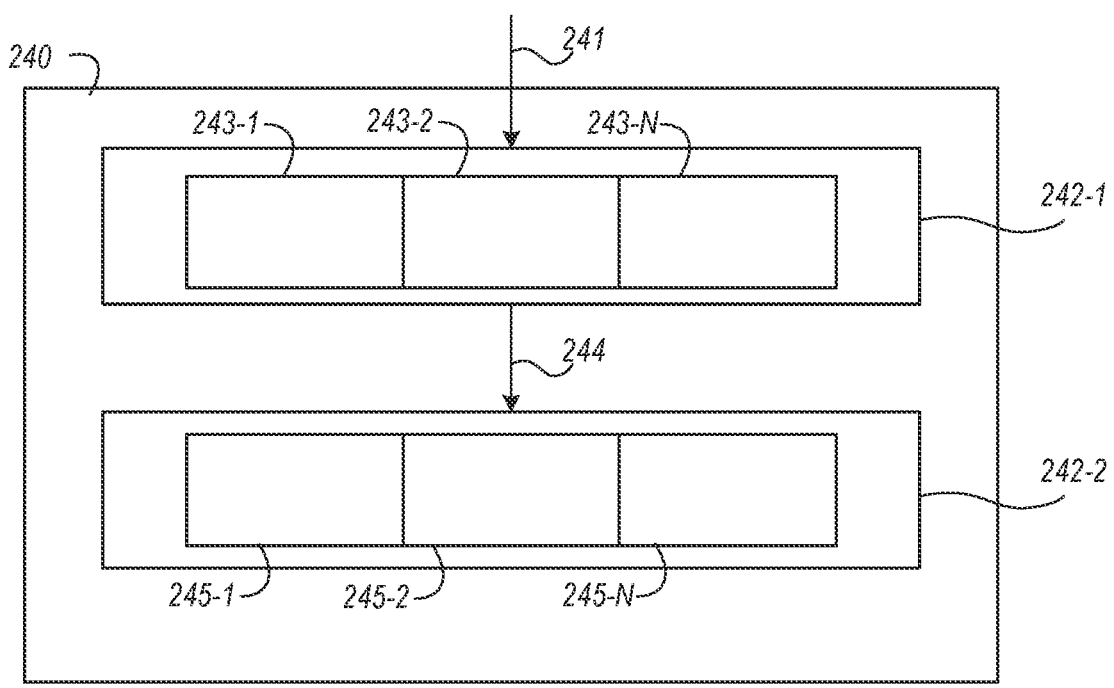
FIG. 2 illustrates an example diagram of a non-volatile memory device for selective single-level memory cell operation in accordance with some embodiments of the present disclosure.

FIG. 2 illustrates an example diagram of a non-volatile memory device 240 for selective single-level memory cell operation in accordance with some embodiments of the present disclosure. The diagrams of FIG. 2 illustrate aspects of performing selective single-level memory cell operation for a memory sub-system having blocks of memory cells such as the memory sub-system 110.

As mentioned, the memory sub-system 110 can include media, such as one or more volatile memory devices (e.g., memory device 140). The volatile memory device can be coupled to a non-volatile memory device (e.g., memory device 130). The volatile memory device can be configured to operate as a cache.

The non-volatile memory device 240 can be a non-volatile memory. As used herein, a non-volatile memory refers to a device having blocks of non-volatile memory cells which are configured to store at least 2 bits per memory cell. The blocks of non-volatile memory cells (243-1, 243-2, . . . , 243-N and 245-1, 245-2, . . . , 245-N; collectively referred to herein as blocks 243, 245) in the non-volatile memory device 240 can include blocks of non-volatile MLCs, TLCs, QLCs, and/or PLCs, among other possibilities.

For instance, the blocks 243, 245 in the non-volatile memory device 240 can include blocks of TLCs that can store three bits of information. In some embodiments, the blocks 243, 245 can include only MLCs, only TLCs, only QLCs, or only PLCs. That is, the blocks 243, 245 do not include any SLCs. As used herein a SLC refers to a memory cell that can store only 1 bit of information per memory cell. In some embodiments the blocks 243, 245 are without SLCs (have an absence of the presence of any SLCs).

A first portion 242-1 of the non-volatile memory device 240 can be selectively configured to operate in a single-level mode, as detailed herein. For instance, a free non-volatile memory block of the non-volatile memory device 240 can be selectively configured to operate in the single-level mode. A "free block" (e.g., an open virtual block, physical block, and/or logical block) generally refers to a memory block where pages of the memory block are free of data (not programmed). The free non-volatile memory block (i.e., a free block) can be included in a free block pool including a plurality of free blocks. Use of a free block can promote rapid configuration of the free block to operate in a single-level mode as compared to use of other blocks having data stored therein.

In some embodiments, a media management operation such as a garbage collection can be performed to add a free blocks to the free block pool. A "garbage collection operation" generally refers to a process of folding data from a victim block stripe into a new destination block stripe, with the intended purpose of data consolidation to free up memory resources for subsequent program/erase cycles. Folding can be performed to pack valid data together (garbage collection), freeing more space for new writes, for error avoidance, for wear leveling, and to restore RAIN parity protection in the event of an error. As used herein, a "block stripe" generally refers to a logical grouping of blocks that share a same upper block number and can be accessed in parallel. Garbage collection operations can include reclaiming (e.g., erasing and making available for programming) memory blocks that have the most invalid pages among blocks in the memory device(s). In some embodiments, garbage collection can include reclaiming memory blocks with more than a threshold amount (e.g., quantity) of invalid pages. However, if sufficient free memory blocks exist for a programming operation, then a garbage collection operation may not occur. Addition of the block to the free block pool can occur in the absence of a host command (e.g., a host write operation and/or a host read operation to the memory sub-system). In this way, media management as detailed herein can occur without relying on a host command and/or in the absence of any associated traffic over a bus or other connection between the host and the memory sub-system.

In some embodiments, selectively configuring free non-volatile memory blocks (from the free block pool) to operate in the single-level mode can occur until a quantity of the first subset of the plurality of non-volatile memory blocks is equal to a target quantity of non-volatile memory blocks. As used herein, a "target quantity" generally refers to a particular total number of blocks. In some embodiments, the target quantity can be equal to 16, 32, 48, 64, 80, 96, 110 blocks, among other possible values. The target quantity can be a value that is stored in a table such as a look-up table or is otherwise stored or accessible to the memory sub-system. In any case, the selective single-level memory operation component, as detailed herein, can be configured to compare a current block count to a target quantity and thereby determine a difference between the current block count and the target quantity. Thus, free blocks can continue to be configured to operate in a single-level mode until the current block count in the first subset of non-volatile memory blocks configured to operate in a single-level mode is equal to the target quantity. In some embodiments, a quantity of free blocks in a free block pool can meet or exceed a target quantity of blocks to be configured in a single-level mode, responsive to detecting an occurrence of a backup power supply failure event. Maintaining a quantity of free blocks (e.g., a quantity of free TLC blocks) in the free block pool that is equal to or greater than a target quantity of blocks can permit the free blocks to be readily configured in a single-level mode, responsive to detecting an occurrence of a backup power supply failure event.

A value of the target quantity can be designated based on an expected operational lifetime of the non-volatile memory device 240, a permissible amount of write amplification, and/or a threshold quantity of IOPS. In some embodiments, the target quantity blocks in the first subset of non-volatile memory blocks can be based on an expected operational lifetime of the first subset of non-volatile memory blocks, the second subset of non-volatile memory blocks, or both. For instance, the target quantity can be determined such that an expected operation lifetime of the first subset (e.g., when accounting for an expected average quantity of PEC counts for the first subset) is substantially equal to an expected operational lifetime of the second subset (e.g., based on an expected average quantity of PEC cycles of the second subset) when accounting for different write amplification factors associated with the first subset and the second subset, as detailed herein. For instance, increasing the quantity of blocks in the first subset can decrease an amount of write amplification experienced by a quantity of blocks in the second subset. In this way, the write amplification experienced by the memory sub-system as a whole can be reduced and/or an expected operational lifetime of the memory sub-system as a whole can be extended, as compared to other approaches that do not employ selective single-level cell memory operation. For instance, in some embodiments, a target quantity of blocks in a first subset of non-volatile memory blocks can be generated responsive to detection of a backup power supply failure event. For example, a garbage collection operation can be performed on a block in a free block pool and/or a block in a user data zone to permit the block to be configured as and included in a first subset of non-volatile memory blocks responsive to detection of a backup power supply failure event. In this way, a quantity of blocks in the first subset can be generated responsive to detection of the backup power supply failure event as compared to having zero blocks in the first subset in the absence of detection of the backup power supply failure event. In some embodiments, the quantity of blocks in the first subset can be generated responsive to detection of the backup power supply failure event and can remain in the first subset on non-volatile memory blocks for the remainder of an operational lifetime of the memory sub-system after detection of the backup power supply failure event.

For instance, the target quality can be determined to ensure an expected operational lifetime of the first subset and an expected operational lifetime of the second subset are equal. That is, a quantity of blocks in the first subset can be generated such that subsequent memory operations such as write operations are dispersed substantially equally between the first subset and the second subset. Having the first subset and the second subset have the same expected operational lifetimes can provide a longer lifetime for the non-volatile memory device 240 as a whole as compared to other approaches that do not employ selective single-level memory cell operation. That is, in many instances it can be desired for blocks in the first subset and blocks in the second subset to reach end of life at the same time.

As mentioned, a first subset 242-1 of the blocks 243, 245 can be configured to operate in a single-level mode, whereas a second subset 242-2 of the blocks 243, 245 can be configured in (or remain configured in accordance with) a multi-level memory mode such as a TLC mode. For instance, as illustrated in FIG. 2 the first subset 242-1 can be formed of the blocks 243-1, 243-2, . . . , 243-N, whereas the second subset 242-2 of the non-volatile memory blocks can be formed of non-volatile memory blocks.

Data (as represented by element identifier 241) can be written to the first subset of memory blocks 242-1 that are configured to operate in the single-level mode as a pseudo single-level cache. For instance, the data 241 can be written to the first subset of memory blocks responsive to a target quantity of blocks being present in the first subset of memory blocks. Subsequently, data (as represented by element identifier 244) can be internally migrated from the first subset of memory blocks 242-1 to the second subset of memory blocks 242-2, as detailed herein. For instance, responsive to a target quantity (e.g., an amount of data equal to a page size of a page included in a memory block in the second subset of memory blocks 242-1) the data 244 can be internally transferred (e.g., as an individual portion of data having a size equal to the target quantity) from a block or blocks of the pseudo single-level cache to the second subset of memory blocks 242-1.

While FIG. 2 illustrates the first subset 242-1 the second subset 242-2 as including a given quantity of memory blocks, the quantity in memory blocks in the first subset 242-1 and/or the quantity in memory blocks in the second subset 242-2 can be varied. For instance, the quantity of memory blocks in the first subset 242-1 and/or the quantity of memory blocks in the second subset 242-2 can be configured such that an expected operational lifetime (e.g., an average expected lifetime) of the first subset 242-1 and/or the expected lifetime of the memory blocks in the second subset 242-2 are substantially equal.

For instance, in some embodiments the quantity of memory blocks in the first subset 242-1 can be less than (i.e., smaller than) a quantity of memory blocks (e.g.,) in the second subset 242-2 such that an expected operational lifetime (e.g., an average expected lifetime) of the first subset 242-1 and/or the expected lifetime of the memory blocks in the second subset 242-2 are substantially equal. A sum of a first quantity of the first subset of non-volatile memory blocks and the second quantity of the second subset of non-volatile memory blocks is equal to a total block count of the non-volatile memory (e.g., a total quantity of blocks omitting blocks which are over-provisioned).

In various embodiments, the first subset 242-1 is formed of blocks 245-1, 245-2, . . . , 245-N with a respective block size (e.g., X/3 pages) that is less than a respective block size (X pages) of the second subset 242-1. In various embodiments, the blocks of the first subset 242-1 have a page size (16 kilobytes) that is less than a page size (e.g., 48 kilobytes) of the blocks of the second subset 242-2.

Figure 3:
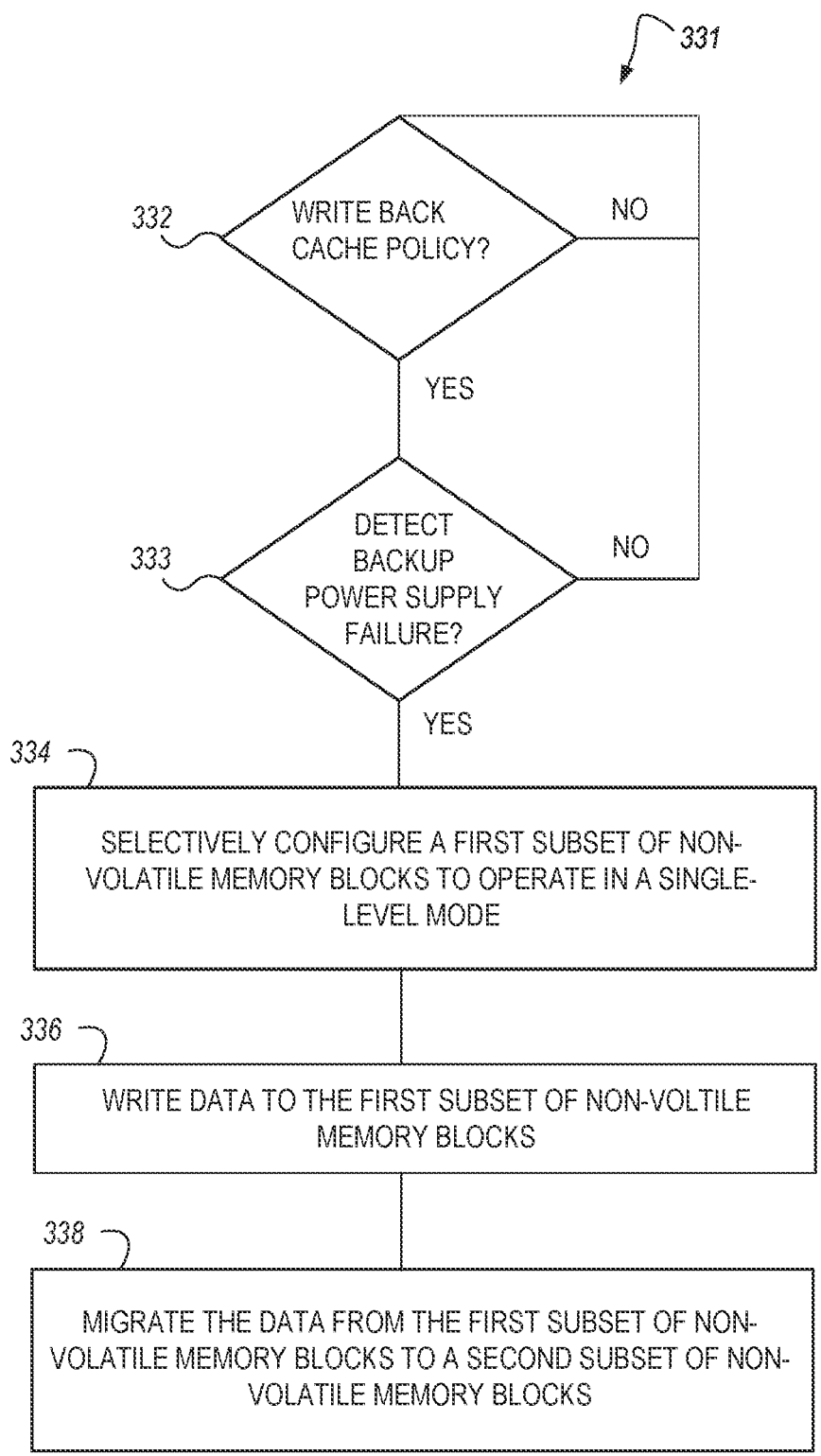
FIG. 3 illustrates a flow diagram for selective single-level memory cell operation in accordance with some embodiments of the present disclosure.

FIG. 3 illustrates a flow diagram 331 for selective single-level memory cell operation in accordance with some embodiments of the present disclosure. At 332, it can be determined whether a cache formed of a volatile memory is operating in accordance with a write-back cache policy. The determination whether the cache is operating in accordance with a write-back cache policy can be made based on a setting of a controller such as the memory sub-system controller, among other possibilities.

Responsive to a determination that the cache is not operating in accordance with a write-back cache policy (e.g., the cache is operating in accordance with a write-through cache policy), the memory sub-system can continue normal operations (e.g., permitting read/write operations to the cache and/or a non-volatile memory coupled to the cache in the absence of selectively configuring a portion of the non-volatile memory to operate in a single-level mode). That is, the entire non-volatile memory can be configured to operate in a multi-level mode in the absence of detection of the cache being operating in accordance with a write-back cache policy. As mentioned, such operation can permit the effective and efficient storage of data in higher level (non-SLC) memory cells, in contrast to other approaches such as those that utilize memory which solely employs SLC memory cells.

Responsive to determination that the cache is operating in accordance with a write-back cache policy, the flow can proceed to 333. As mentioned, data associated with a cache operating in accordance with a write-back policy can be subject to loss. At 333, it can be determined whether a backup power supply failure event is detected. A backup power supply failure event can be detected based on change in a signal such a change in a supply voltage supplied to the memory sub-subsystem, among other possibilities. For instance, a backup power supply failure event can be detected based on a change in a backup voltage supplied (or available to) the memory sub-system, among other possibilities.

In the absence of detection of a backup power supply failure event, the memory sub-system can continue normal operations. For instance, a controller can configure a first subset of the non-volatile memory blocks to a multi-level mode in the absence of detection of a backup power supply failure event. In some embodiments, a default configuration of the first subset of non-volatile memory blocks can be a multi-level mode. In any case, the entire non-volatile memory (e.g., all available memory blocks) can be configured to operate in a multi-level mode in the absence of detection of a backup power supply failure event.

Responsive to detection of a backup power supply failure event the flow can proceed to 334. At 334, a controller can selectively configure a first subset of the non-volatile memory blocks to operate in a single-level mode. Configuration of the blocks into single-level mode can be performed by a memory sub-system controller or otherwise. For instance, the memory sub-system controller can change a setting or value associated with a given memory block to alter operation of the memory block from operation in a multi-level mode to operation in a single-level mode. The indicator of a current operation mode (e.g., single-level mode or multi-level mode) such as a value or other indicator can be stored in a table such as a look-up table or is otherwise stored or accessible to the memory sub-system.

For instance, the memory sub-system controller can, responsive to detection of a backup power supply failure event, alter that operation mode of a free memory block to operate in the single-level mode. In such instances, the memory sub-system controller can subsequently alter the memory block to operate in multi-block mode and/or return the memory block to a free block pool following an elapse of a given amount of time and/or responsive to an occurrence of a memory sub-system condition. For instance, the memory sub-system controller can revert the memory block to multi-block operation and return the memory block to a free block pool responsive to detection of an occurrence of an absence of a backup power supply failure event associated with a memory sub-system, among other possibilities. For example, a backup power supply may be replaced or altered (e.g., replaced with a new functional backup power supply) and the memory sub-system controller can revert the memory block to multi-block operation and return the memory block to a free block pool responsive to detection of an occurrence of an absence of a backup power supply failure event subsequent to the replacement of the backup power supply.

As mentioned, each of the non-volatile memory blocks configured to operate in the single-level mode can be configured to collectively operate as a pseudo single-level cache, as detailed herein. For instance, the blocks in the first subset can be configured to operate collectively as a pseudo single-level cache and the data can be written sequentially to the blocks configured to operate as a pseudo single-level cache. In various embodiments, each memory block in the first sub-set of non-volatile memory blocks can be configured as a pseudo single-level cache by assignment of a block index number (e.g., consecutive numbers e.g., 0 . . . N−1) such that each of the blocks can be consecutively written to for consecutive host write operations.

At 336, data can be written to the first subset of memory blocks which are configured as a pseudo single-level cache. For instance, data associated with performance of a first memory operation can be written to a first block in a pseudo single-level cache having a first block index value. The data can be written to pages in the first block until the last page in the first block is full.

Data can subsequently be written to a second block (having the next block value in a sequence of block index values). For instance, data associated with performance of a second memory operation subsequent to the first memory operation can be written to a second block in the pseudo single-level cache that has a second block index value in the pseudo single-level cache. Notably, in such instances the first block index value and the second block index value are consecutive block index values. This manner of writing data to the blocks configured in the single-level mode to collectively operate as a single-level cache can continue on a loop (e.g., such that each block is written to before performing an additional write to any given block in the pseudo single-level cache).

In this way, the host can readily write to the blocks of the first subset and any wear can be levelized within the first subset. For instance, respective PEC counts of the each of the memory blocks in the first subset can increase at substantially similar rates by consecutively writing to different blocks within the first sub-set of memory blocks. For instance, the data can be written to consecutive blocks until all data from a volatile cache memory is written to consecutive blocks of the first subset responsive to detection of a backup power supply failure event. In various embodiments, responsive to detection of a backup power supply failure event: i) a first portion of the non-volatile memory can be configured to operate in a single-level mode as a pseudo single-level cache, ii) data can be written from the volatile memory to the first portion of the multi-level non-volatile memory configured to operate as the pseudo single-level cache, iii) the volatile memory or cache (e.g., operating in accordance with a write-back policy) can be configured to operate in accordance with a write-through policy; and iv) responsive to a threshold amount of data being written to the first portion of the multi-level volatile memory, the data can be internally migrated from the first portion of the non-volatile memory to a second portion of the non-volatile memory. In this way, the data from the volatile cache memory can be quickly stored in the non-volatile memory so that data is not lost due to the occurrence of the backup power supply failure event.

At 338, data can be migrated from the first subset of the non-volatile memory blocks to a second subset of non-volatile memory blocks of the non-volatile memory. Such folding or internal migration can migrate the data intact (e.g., migrate all data from the first portion to the second portion) and thus can have a write amplification of 1, as compared to what would otherwise be multiple host write operations to directly write such data to the second subset of the non-volatile memory blocks. In this way, the data can be effectively and efficiently stored in the higher level memory cell (e.g., TLC) of the second subset, and yet write amplification can be reduced as compared to other approaches that may seek to directly write such data to the second subset of the non-volatile memory blocks.

In some embodiments, data from the first portion of the non-volatile memory can be internally migrated (folded) to a second portion of the non-volatile memory responsive to a threshold amount of data being written to the first portion of the multi-level volatile memory. For instance, the threshold amount of data can be equal to a page size (e.g., 48 kilobytes) of the second portion of the non-volatile memory.

Figure 4:
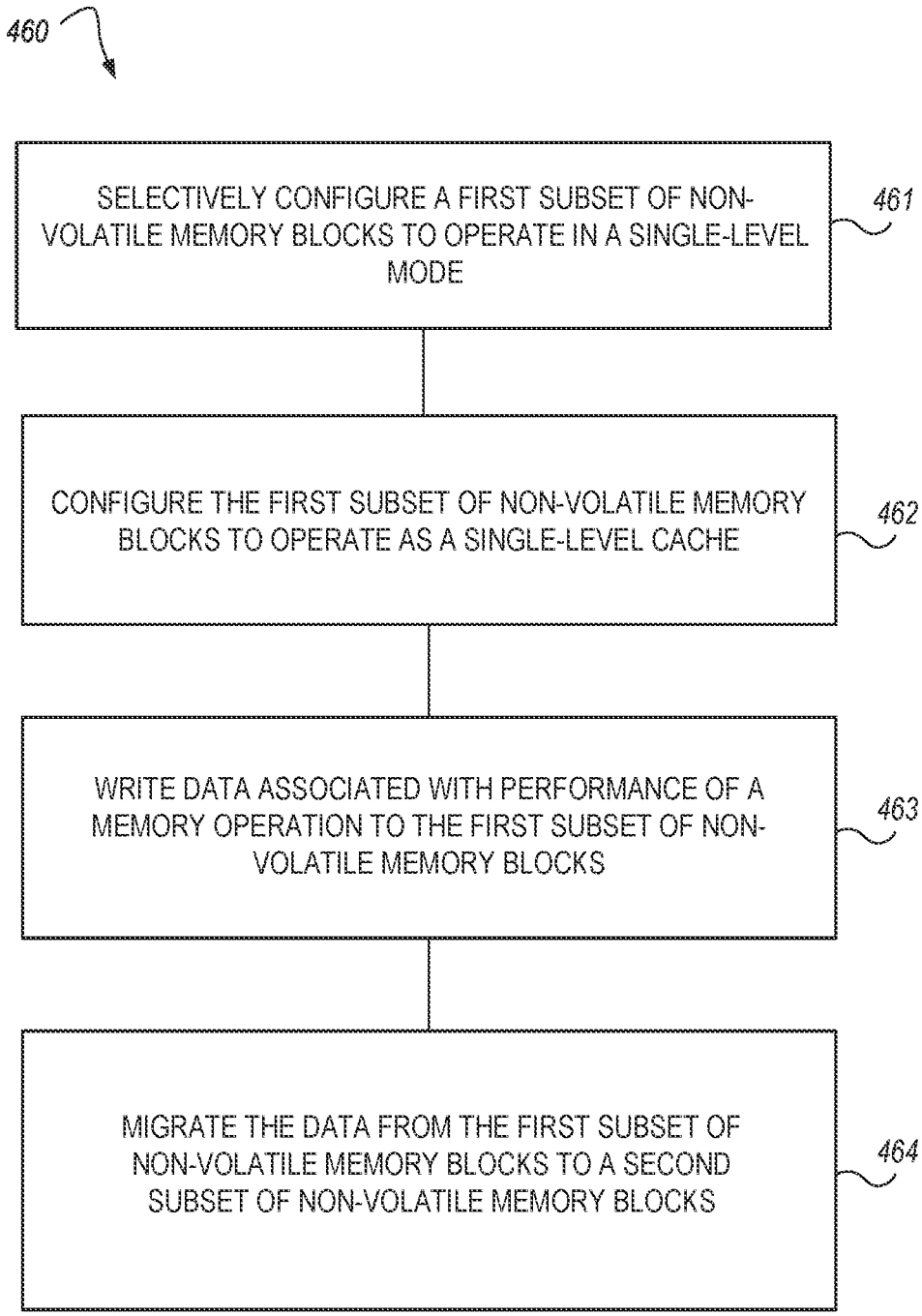
FIG. 4 is a flow diagram corresponding to a method for selective single-level memory cell operation in accordance with some embodiments of the present disclosure.

FIG. 4 is a flow diagram corresponding to a method for selective single-level memory cell operation in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the selective single-level memory cell operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 461, a first subset of non-volatile memory blocks of a plurality of non-volatile memory blocks of a non-volatile memory can be selectively configured to operate in a single-level mode. For instance, in some embodiments a non-volatile memory can be configured to operate in non-single-level mode as a default configuration. As mentioned, examples of non-single-level modes include MCL mode, triple-level mode, quad-level mode, or penta-level mode. In such instances each memory block or portion of the non-volatile memory can operate in a higher level mode (i.e., a non-single-level mode) as a default configuration. Having the non-volatile memory configured to operate in the higher level mode (e.g., TLC mode) as a default configuration can promote efficient and effective storage of large amounts of data.

However, as mentioned, the first subset can be selectively configured to operate in the single-level mode responsive to an occurrence of an event. An occurrence of an event can be detected based on a change in a memory sub-system condition such as a change in input power (e.g., backup power) provided to the memory sub-system. That is, in various embodiments the first subset can be selectively configured to operate in the single-level mode responsive to an occurrence of a backup power supply failure event. In various embodiments, the first subset of non-volatile memory blocks operate in a multi-level mode, triple-level mode, quad-level mode, or penta-level mode in the absence of detection of the backup power supply failure event. Stated differently, an entirety of the non-volatile memory which is not otherwise reserved (e.g., for overprovisioning purposes) can be configured to operate in a non-single-level mode in the absence of detection of an event such as a backup power supply failure event.

In some embodiments, a block can be selected from a free block pool to be configured to operate in a single-level mode. The selected block can be a block in the free block pool having a high health characteristic value (e.g., a high PEC count). For example, a destination block having a high PEC count (e.g., the highest PEC count) can be selected thereby promote normalizing PEC counts (e.g., reduction of a difference between a highest PEC count and lowest PEC count) of a plurality of blocks.

At 462, the first subset of non-volatile memory blocks can be configured to operate as a pseudo single-level cache, as detailed herein. For instance, each non-volatile blocks of the first subset of non-volatile memory blocks can be assigned a respective block index number to permit data to be sequentially written to each of the non-volatile memory blocks of the first subset of non-volatile memory blocks.

At 463, data associated with performance of a memory operation (e.g., a host write operation) can be written to a the first subset of non-volatile memory blocks which are configured as the pseudo single-level cache. For instance, the data can be written to a page in a block in the pseudo single-level cache which is next in a write-loop involving the sequential writing to respective blocks which form the pseudo single-level cache.

At 464, the data can be migrated (e.g., folded) from the first subset of the non-volatile memory blocks to a second subset of non-volatile memory blocks. For instance, the data can be migrated from the first subset of the non-volatile memory blocks to the second sub-set of non-volatile memory blocks responsive to a threshold amount of data (e.g., an amount of data equal to a page size of a block in the second subset) being written to the first subset of the multi-level volatile memory.

In this way, an amount of write amplification can be reduced. For instance, the write amplification for the overall memory system (WAsystem) can be equal to the write amplification associated with the first subset (WAslc) plus the write amplification associated with folding data from the first subset to the second subset (equal to 1)*an amount of write amplification associated with the second subset (WAtlc) (at a given over-provisioning level using TLC as an example), as represented below in Equation 1.

$$WA_{system} = WA_{slc} + (1 * WA_{tlc}) \quad \text{(Equation 1)}$$

Thus, using the above example for 4 kilobytes of host data per host write operation and a 16 kilobyte effective page size the amount $WA_{slc}$ is equal to 4 (for a single plane). $WA_{tlc}$ for a given size of non-volatile memory (at a given overprovisioning level) can be equal to 5, among other possible values depending on a size of the non-volatile memory/degree of over-provisioning. In any case, the write amplification for the overall memory system (WAsystem) can be reduced. For instance, in the above example the write amplification can be reduced to a total system write amplification of 9 (e.g., as compared to a system write amplification factor of at least 12 associated with other approaches that directly write data to multi-level cells such as TCL memory cells, as detailed above).

Figure 5:
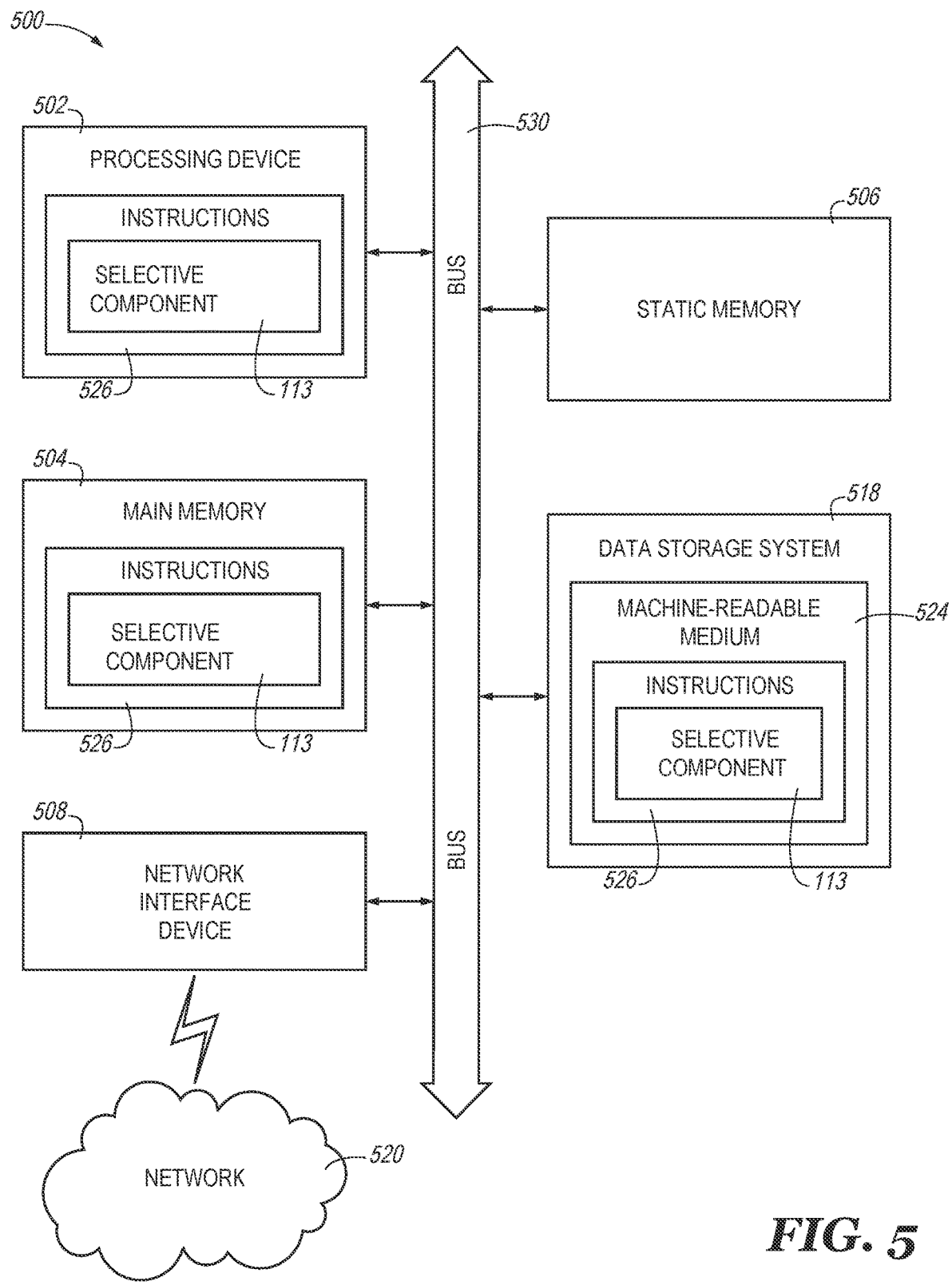
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the selective single-level memory operation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a selective component (e.g., the selective single-level memory cell operation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer).

In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
selectively configuring a first subset of non-volatile memory blocks of a plurality of non-volatile memory blocks of a non-volatile memory to operate in a single-level mode responsive to detection of a backup power supply failure event;
configuring the first subset of non-volatile memory blocks to collectively operate as a pseudo single-level cache;
writing data associated with performance of a memory operation to the first subset of non-volatile memory blocks configured as the pseudo single-level cache; and
migrate the data from the first subset of non-volatile memory blocks configured as the pseudo single-level cache to a second subset of non-volatile memory blocks of the plurality of non-volatile memory blocks.

2. The method of claim 1, further comprising selectively configuring free non-volatile memory blocks to operate in the single-level mode.

3. The method of claim 2, further comprising:
maintaining a quantity of blocks in a free block pool that is equal to or greater than a target quantity of blocks; and
selectively configuring, from the free block pool, the free non-volatile memory blocks to operate in the single-level mode until a quantity of blocks in the first subset of non-volatile memory blocks is equal to the target quantity of blocks.

4. The method of claim 1, further comprising determining a target quantity block in the first subset of non-volatile memory blocks based on an expected operational lifetime of the first subset of non-volatile memory blocks, the second subset of non-volatile memory blocks, or both.

5. The method of claim 1, further comprising determining, based on comparison of an expected operational lifetime of the second subset of the plurality of non-volatile memory blocks, a target quantity of the first subset of the plurality of non-volatile memory blocks.

6. The method of claim 1, further comprising designating, based on an expected operation lifetime of the first subset of the plurality of non-volatile memory blocks being equal to an expected operational lifetime of the second subset of the plurality of non-volatile memory blocks, a target quantity of the first subset of the plurality of non-volatile memory blocks.

7. The method of claim 1, wherein selectively configuring the first subset of non-volatile memory blocks to operate in the single-level mode further comprises generating a target quantity of the first subset of the plurality of non-volatile memory blocks blocks of non volatile memory subsequent to detection of the backup power supply failure event.

8. The method of claim 1, further comprising writing data, associated with performance of a plurality of memory operations, to sequential blocks of non-volatile memory included in the first subset of the plurality of non-volatile memory blocks.

9. An apparatus, comprising:
a volatile memory;
a non-volatile memory comprising non-volatile memory blocks; and
a controller configured to:
selectively configure a first subset of non-volatile memory blocks of the non-volatile memory to operate:
in a single-level mode responsive to detection of a backup power supply failure event; and
in a multi-level mode, triple-level mode, quad-level mode, or penta-level mode in an absence of detection of the backup power supply failure event;
in response to receipt of signaling indicative of an access request from a host, write data associated with performance of a memory operation to the volatile memory;
write the data from the volatile memory to the first subset of non-volatile memory blocks; and
migrate the data from the first subset of the non-volatile memory blocks to a second subset of non-volatile memory blocks of the non-volatile memory.

10. The apparatus of claim 9, wherein the first subset of the non-volatile memory blocks has a respective block size that is less than a respective block size of the second subset of non-volatile memory blocks.

11. The apparatus of claim 9, wherein the first subset of blocks of non-volatile memory has a page size that is less than a page size of the second subset of blocks of non-volatile memory.

12. The apparatus of claim 9, wherein a sum of a first quantity of the first subset of non-volatile memory blocks and a second quantity of the second subset of non-volatile memory blocks is equal to a total block count of the non-volatile memory.

13. A system comprising:
a memory sub-system comprising:
a volatile memory; and
a non-volatile memory; and
a processing device coupled to the memory sub-system, the processing device to perform operations comprising:

operate the volatile memory in accordance with a write-back cache policy;
configure a first portion of the non-volatile memory to operate:
- in a single-level mode as a pseudo single-level cache responsive to detection of a backup power supply failure event; and
- in a multi-level mode, triple-level mode, quad-level mode, or Penta-level mode in an absence of detection of the backup power supply failure event;

write data from the volatile memory to the first portion of the non-volatile memory configured to operate as the pseudo single-level cache; and
responsive to a threshold amount of data being written to the first portion of the non-volatile memory, internally migrate the data from the first portion of the non-volatile memory to a second portion of the non-volatile memory.

14. The system of claim 13, further comprising configuring each block in the first portion of the non-volatile memory, to operate collectively as a pseudo single-level cache by assigning consecutive block index numbers to each block in the first portion; and wherein the operations further include:

write data, associated with performance of a first memory operation, to a first block, having a first block index value, in the pseudo single-level cache; and
write data, associated with performance of a second memory operation subsequent to the first memory operation, to a second block, in the pseudo single-level cache, that has a second block index value in the pseudo single-level cache, wherein the first block index value and the second block index value are consecutive block index values.

15. The system of claim 13, wherein the non-volatile memory is comprised of multi-level cells, triple level cells, quad-level cells, or penta-level cells.

16. The system of claim 13, wherein the threshold amount of data is equal to a page size of a page included in a non-volatile memory block in the second portion of the non-volatile memory.

17. The system of claim 13, wherein responsive to the detection of the backup power supply failure event, the processing device is further to operate the volatile memory in accordance with a write-through cache policy.

* * * * *